United States Patent
Jung

(10) Patent No.: US 7,742,123 B2
(45) Date of Patent: Jun. 22, 2010

(54) COLOR-FILTERLESS LCD

(75) Inventor: Il-yong Jung, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 495 days.

(21) Appl. No.: 11/714,114

(22) Filed: Mar. 6, 2007

(65) Prior Publication Data

US 2007/0268426 A1    Nov. 22, 2007

(30) Foreign Application Priority Data

Mar. 6, 2006    (KR)    ........................ 10-2006-0020955

(51) Int. Cl.
*G02F 1/1335*    (2006.01)
(52) U.S. Cl. .............................. 349/62; 349/65; 349/57; 349/95; 349/112; 362/602; 362/612; 362/13; 362/615
(58) Field of Classification Search .................... 349/62, 349/65, 61, 57, 95, 106, 112; 362/602, 611, 362/615, 13, 20, 11, 612
See application file for complete search history.

(56) References Cited

U.S. PATENT DOCUMENTS 5,748,828 A * 5/1998 Steiner et al. ............... 385/146
6,967,699 B2 * 11/2005 Baek ........................... 349/65
7,576,805 B2 * 8/2009 Ito et al. ...................... 349/15
2004/0240232 A1 * 12/2004 Choi et al. .................. 362/583

FOREIGN PATENT DOCUMENTS

| JP | 2003-035904 A | 2/2003 |
| JP | 2005-197072 A | 7/2005 |
| KR | 10-2004-0057383 A | 7/2004 |

* cited by examiner

*Primary Examiner*—Thoi V Duong
(74) *Attorney, Agent, or Firm*—Sughrue Mion, PLLC

(57) ABSTRACT

A color-filterless liquid crystal display (LCD) having a large screen. The color-filterless LCD further including a light guide plate uniformly emitting light, which is incident from both lateral sides, through a top surface thereof; first and second light sources disposed on both the lateral sides of the light guide plate; a color separation sheet that is disposed on the top surface of the light guide plate and is adapted to separate incident light into red, green, and blue light beams and emit them at different exit angles; a liquid crystal panel having a liquid crystal layer that is divided into a plurality of pixels; and an optical element sheet that is disposed on a bottom surface of the liquid crystal panel and includes a plurality of optical elements focusing the red, green, and blue light beams separated by the color separation sheet on three different pixels that are continuously arranged, where the first and second light sources are turned on alternately.

19 Claims, 6 Drawing Sheets

COLOR-FILTERLESS LCD

CROSS-REFERENCE TO RELATED PATENT APPLICATION

This application claims priority from Korean Patent Application No. 10-2006-0020955, filed on Mar. 6, 2006, in the Korean Intellectual Property Office, the disclosure of which is incorporated herein in its entirety by reference.

BACKGROUND OF THE INVENTION

1. Field of the Invention

The present invention relates to a color-filterless liquid crystal display (LCD), and more particularly, to a color-filterless LCD having a large screen.

2. Description of the Related Art

In general, liquid crystal displays (LCDs) include a backlight unit which uniformly emits white light and an LCD unit. Since the LCD unit only transmits or blocks the white light generated by the backlight unit, the LCDs also require color filters that respectively transmit red (R), green (G), and blue (B) light beams to produce color images. However, since each of the color filters filter only one of the red (R), green (G), and blue (B) light beams passing through the LCD unit, the LCDs achieve a transmission rate of only 30% or so. Considering light loss through other optical components, only 10% of the light emitted from the backlight unit is actually transmitted to viewers. The light loss of the LCDs mainly occurs in the color filters. Also, the color reproducibility of the LCDs greatly depends on the performance of the color filters.

To address these problems, a color-filterless LCD device which can produce color images without color filters has been developed. FIG. 1 is a cross-sectional view of a conventional color-filterless LCD. Referring to FIG. 1, the conventional color-filterless LCD includes a backlight unit 20 that emits light beams at different exit angles according to wavelengths and an LCD unit 10 that includes optical elements for focusing light beams having predetermined wavelengths on predetermined pixels.

The backlight unit 20 includes a light guide plate (LGP) 21, a plurality of light sources 22 arranged on a lateral side of the LGP 21, and a color separation sheet 23 disposed on a top surface of the transparent LGP 21 and transmitting light beams at different exit angles according to wavelengths. The color separation sheet 23 may be a diffraction grating sheet in which diffraction gratings are periodically arranged in a sinusoidal, prism-like, or quadrangular configuration. The LGP 21 may become thinner away from the light sources 22 to uniformly emit light.

The LCD display unit 10 includes cylindrical lenses 11, a transparent plate 12, a liquid crystal panel 13 having a liquid crystal layer divided into a plurality of pixels, a diffractive optical element (DOE) 14 for transmitting light in a vertical direction, and a transparent plate 15.

In the conventional color-filterless LCD, light incident from the lateral side of the LGP 21 is totally reflected inside the LGP 21, and then is obliquely incident on the top surface of the LGP 21. Part of the light obliquely incident on the top surface of the LGP 21 is totally reflected again, and another part of the light is separated into colored light beams by the color separation sheet 23 and the colored light beams are emitted at different exit angles according to wavelengths from the top surface of the LGP 21. For example, a green (G) light beam is emitted at an exit angle of 0°, a blue (B) light beam is emitted at an exit angle of approximately −10°, and a red (R) light beam is emitted at an exit angle of approximately +10°.

Next, the respective light beams are incident on the cylindrical lenses 11. Referring to FIG. 1, each of the cylindrical lenses 11 corresponds to three pixels of the liquid crystal panel 13. The light beams incident on the cylindrical lens 11 converge on different positions according to their incident angles. Referring to FIG. 1, the green (G) light beam converges on the central pixel among the three pixels, the blue (B) light beam converges on the left pixel, and the red (R) light beam converges on the right pixel. Since the light beams are separately incident on the different pixels of the liquid crystal panel 13 according to wavelengths, color images can be produced without color filters.

Since the conventional color-filterless LCD does not need color filters, light loss due to the color filters is prevented. Accordingly, the conventional color-filterless LCD can achieve high brightness. However, the conventional color-filterless LCD has a drawback in that it should only use an edge type backlight unit.

This is because the angle of the light incident on the color separation sheet 23 must be large enough to achieve sufficient color separation by means of the color separation sheet 23. Referring to FIG. 2A, when the light is incident on the color separation sheet 23 at a small incident angle $\alpha$, the colored light beams are emitted at large exit angles $\beta_B$, $\beta_G$, and $\beta_R$, respectively, such that it is difficult to converge the respective colored light beams on the desired pixels in spite of color separation. To converge the respective colored light beams on the desired pixels, the green (G) light beam may be emitted at an exit angle of 0°, and the red (R) and blue (B) light beams may be emitted at symmetric exit angles. For example, if the incident angle is approximately 70°, the green (G) light beam can be emitted at an angle of approximately 0°, the blue (B) light beam can be emitted at an angle of approximately −10°, and the red (R) light beam can be emitted at an angle of approximately +10°. However, if the conventional color-filterless LCD employs a direct type backlight unit, the LCD fails to achieve sufficient color separation since light is incident on the color separation sheet 23 at a small angle.

The edge type backlight unit can be used only for small LCDs because as the LGP 21 becomes larger, a side opposite to the side where the light sources 22 are installed is darker, thereby degrading brightness uniformity. Also, as the LGP 21 becomes larger, overall brightness is degraded. Accordingly, the edge type backlight unit is applied only to 17-inch or smaller LCDs to ensure optimal brightness and brightness uniformity.

SUMMARY OF THE INVENTION

The present invention provides a color-filterless liquid crystal display (LCD) that can be used as a small LCD as well as a large LCD.

According to a non-limiting embodiment of the present invention, there is provided a color-filterless liquid crystal display comprising: a light guide plate uniformly emitting light, which is incident from both lateral sides, through a top surface thereof; first and second light sources disposed on both the lateral sides of the light guide plate; a color separation sheet that is disposed on the top surface of the light guide plate and is adapted to separate incident light into red, green, and blue light beams and emit them at different exit angles; a liquid crystal panel having a liquid crystal layer that is divided into a plurality of pixels; and an optical element sheet that is disposed on a bottom surface of the liquid crystal panel and includes a plurality of optical elements focusing the red, green, and blue light beams separated by the color separation sheet on three different pixels that are continuously arranged, wherein the first and second light sources are turned on alternately.

The liquid crystal panel may be driven in synchronization with the operation cycle of the first and second light sources so that color data can be input to the continuously arranged three different pixels in the order of red, green, and blue light beams or in the order of blue, green, and red light beams Each of the first and second light sources may be turned on once while the liquid crystal panel displays an image of one frame.

The light guide plate may have a flat shape.

The color separation sheet may be a diffraction grating sheet in which a plurality of diffraction gratings are periodically arranged facing the liquid crystal panel.

Among the red, green, and blue light beams separated by the color separation sheet, the green light beam may have an exit angle of 0°, and the red and blue light beams may have exit angles that are substantially symmetric about the green light beam.

When the first light source is turned on and the second light source is turned off, the blue light beam may have a negative exit angle and the red light beam may have a positive exit angle, and when the first light source is turned off and the second light source is turned on, the blue light beam may have a positive exit angle and the red light beam may have a negative exit angle.

When the first light source is turned on and the second light source is turned off, the color data may be input to the continuously arranged three different pixels in the order of blue, green, and red light beams, and when the first light source is turned off and the second light source is turned on, the color data may be input to the continuously arranged three different pixels in the order of red, green, and blue light beams.

Each of the first and second light sources may include a plurality of light emitting diodes respectively emitting the red, green, and blue light beams.

The plurality of optical elements may be a plurality of cylindrical lenses that are arranged in parallel.

Each of the plurality of cylindrical lenses may correspond to three pixels of the liquid crystal panel.

The color-filterless liquid crystal display may further comprise a diffractive optical element that is disposed on a top surface of the liquid crystal panel and perpendicularly emits light passing through the liquid crystal panel.

The color-filterless liquid crystal display may further comprise a glass substrate that is disposed on the diffractive optical element, has a flat top surface such that a front surface of the color-filterless liquid crystal display looks flat, and protects the diffractive optical element.

The liquid crystal panel may have a size of 19 to 32 inches.

BRIEF DESCRIPTION OF THE DRAWINGS

The above and other features and aspects of the present invention will become more apparent by describing in detail exemplary, non-limiting embodiments thereof with reference to the attached drawings in which.

DETAILED DESCRIPTION OF EXEMPLARY EMBODIMENTS OF THE INVENTION

The present invention will now be described more fully with reference to the accompanying drawings, in which exemplary, non-limiting embodiments of the invention are shown.

Figure 4:
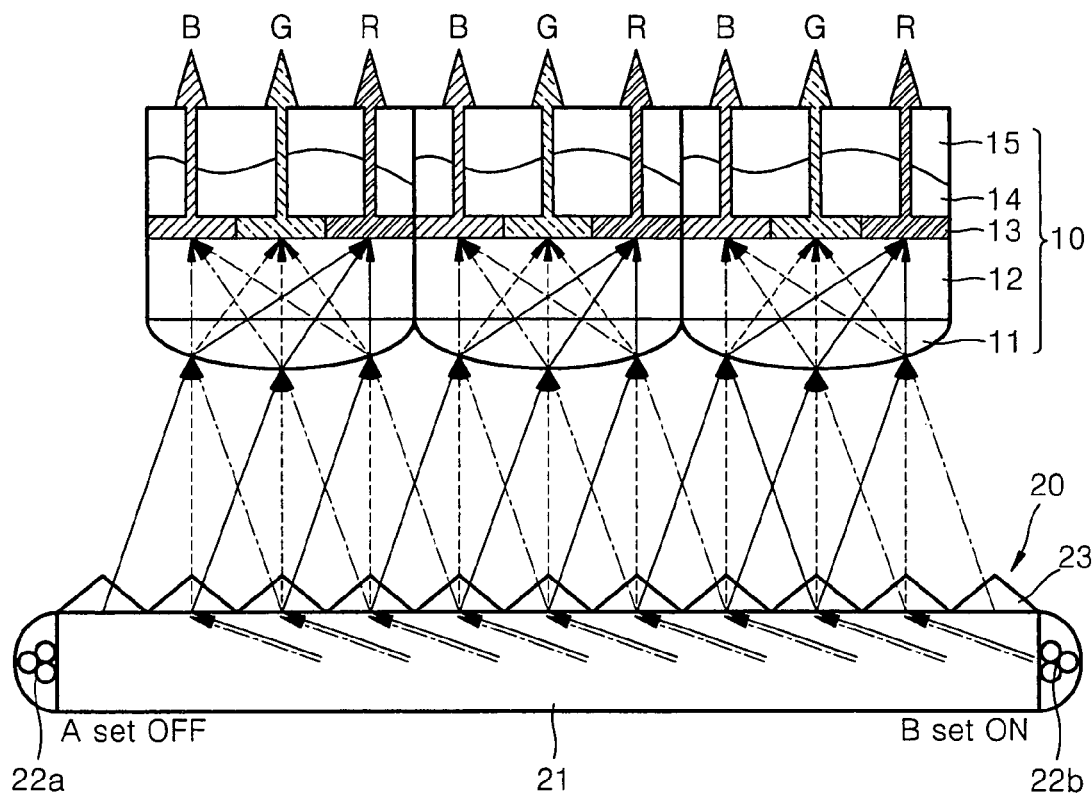
FIGS. 4 and 5 are cross-sectional views of a color-filterless LCD according to an embodiment of the present invention.
Figure 5:
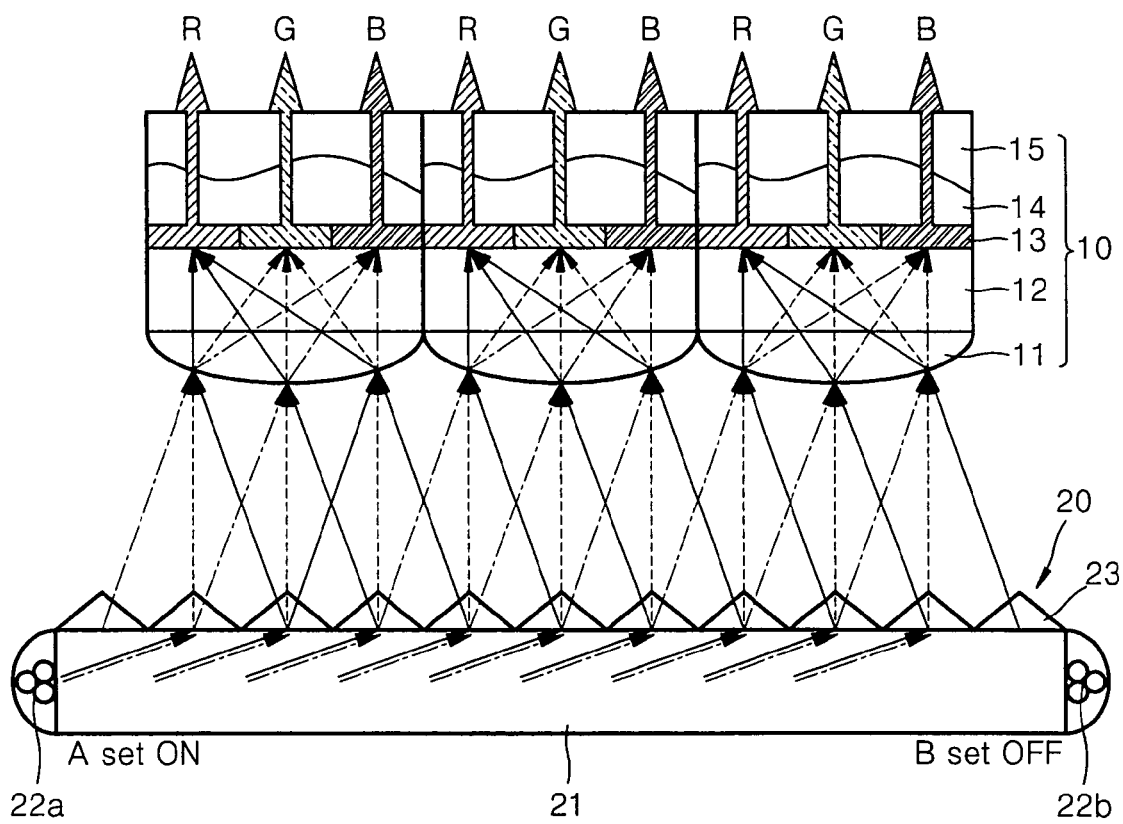

FIGS. 4 and 5 are cross-sectional views of a color-filterless liquid crystal display (LCD) according to a non-limiting embodiment of the present invention. Referring to FIGS. 4 and 5, the color-filterless LCD includes a backlight unit 20 that emits light beams at different exit angles according to wavelengths, and an LCD unit 10 having optical elements that focus light beams having predetermined wavelengths on predetermined pixels.

The backlight unit 20 includes a light guide plate (LGP) 21, first and second light sources 22a and 22b arranged on both lateral sides of the LGP 21, and a color separation sheet 23 that is disposed on a top surface of the LGP 21 and emits light beams at different exit angles according to wavelengths. The color separation sheet 23 separates obliquely incident light into red (R), green (G), and blue (B) light beams and emit them at different exit angles. The color separation sheet 23 may be a diffraction grating sheet in which diffraction gratings are periodically arranged in a sinusoidal, prism-like, or quadrangular configuration. The LGP 21 uniformly emits light incident from both the lateral sides through its top surface. As illustrated in FIGS. 4 and 5, the LGP 21 may have a flat shape having parallel top and bottom surfaces. Each of the first and second light sources 22a and 22b may include a plurality of light emitting diodes (LEDs) that respectively emit red (R), green (G), and blue (B) light beams. Alternatively, the first and second light sources 22a and 22b may be cold cathode fluorescent lamps (CCFLs).

The LCD unit 10 includes a liquid crystal panel 13 having a liquid crystal layer that is divided into a plurality of pixels, a transparent substrate 12 disposed on a bottom surface of the liquid crystal panel 13, an optical element sheet 11 disposed on a bottom surface of the transparent substrate 12, a diffractive optical element (DOE) 14 that is disposed on a top surface of the liquid crystal panel 13 and perpendicularly emits light passing through the liquid crystal panel 13, and a glass substrate 15 disposed on the DOE 14. The glass substrate 15 for protecting the DOE 14 has a flat top surface such that a front surface of the color-filterless LCD looks flat. Here, the liquid crystal panel 13, the transparent substrate 12, the optical element sheet 11, the DOE 14, and the glass substrate 15 constitute a single LCD unit 10.

The transparent substrate 12 disposed on the bottom surface of the liquid crystal panel 13 and the optical element sheet 11 disposed on the bottom surface of the transparent substrate 12 may be integrally formed of a single transparent material. The optical element sheet 11 is configured such that a plurality of fine optical elements are arranged in two dimensions. Each of the optical elements focuses the red (R), green (G), and blue (B) light beams separated by the color separation sheet 23 on three different pixels that are continuously arranged in the liquid crystal panel 13. For example, the plurality of optical elements may be a plurality of cylindrical lenses that are arranged in parallel as shown in FIGS. 4 and 5. In this case, each of the plurality of cylindrical lenses may correspond to three pixels of the liquid crystal panel 13.

The operation of the color-filterless LCD constructed as above will now be explained below.

Figure 1:
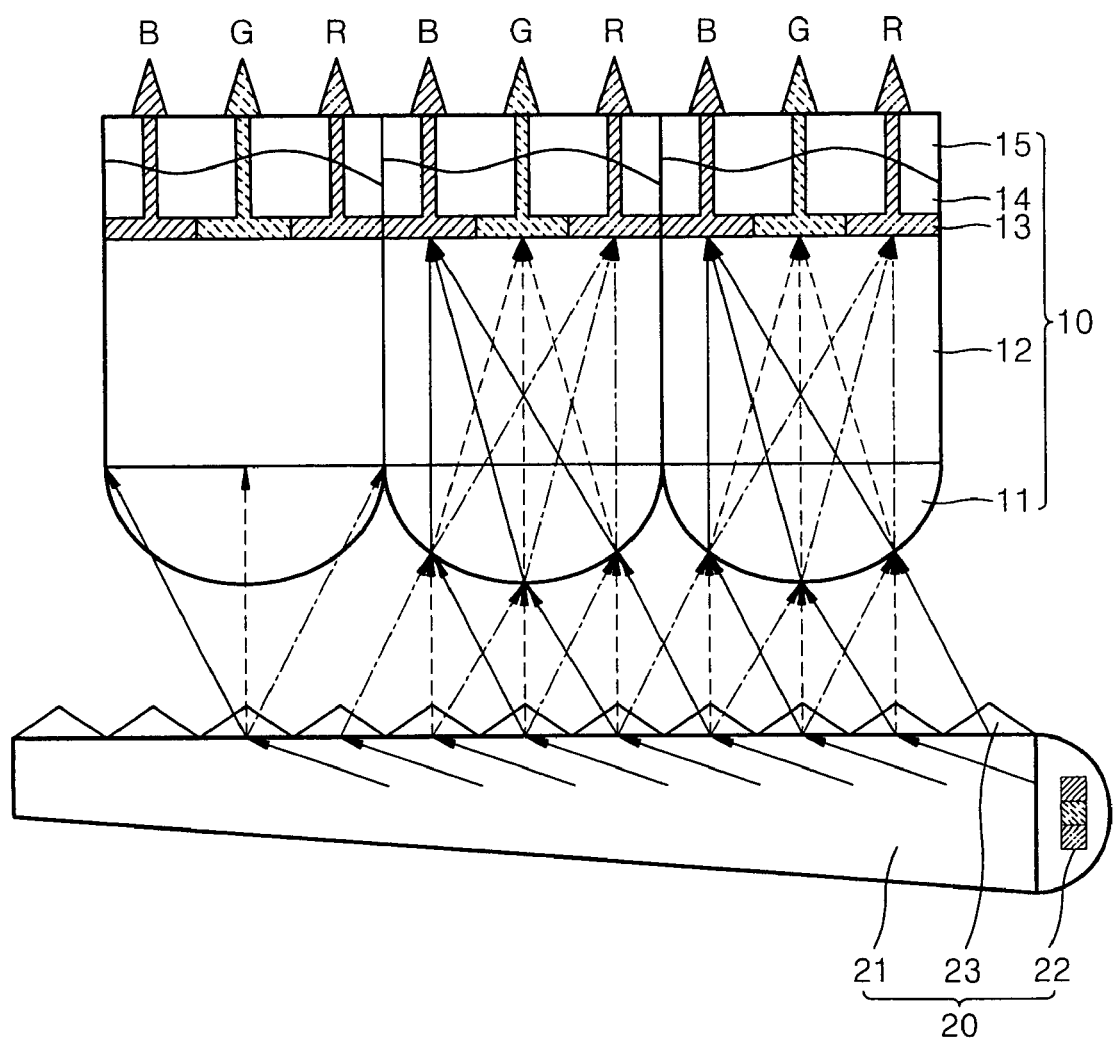
FIG. 1 is a cross-sectional view of a conventional color-filterless liquid crystal display (LCD)
Figure 2A:
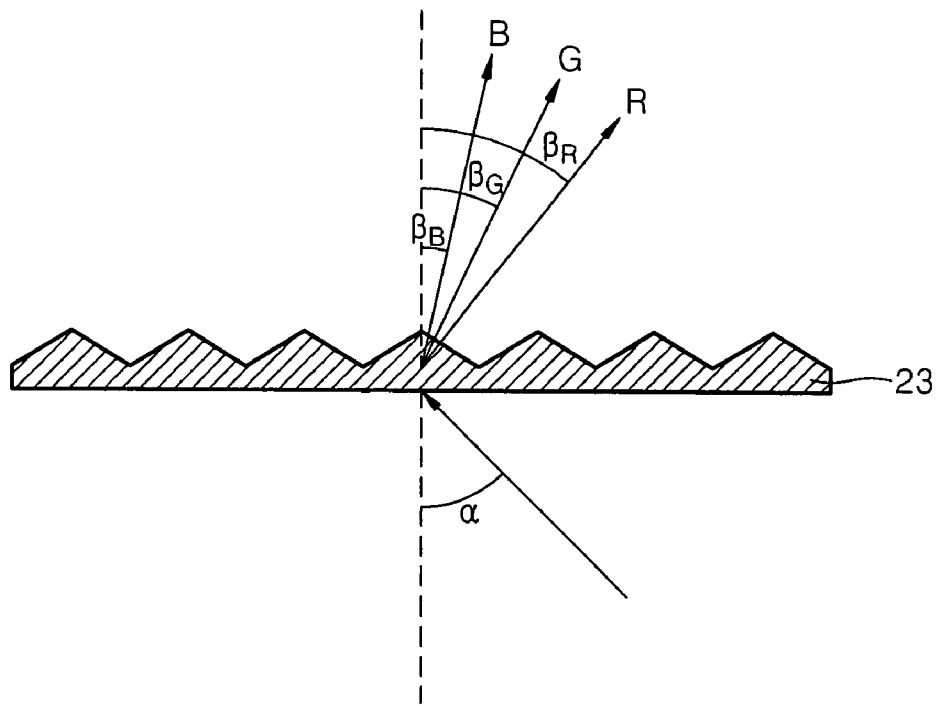
FIG. 2A is a cross-sectional view illustrating exit angles of light beams with respect to an incident angle on diffraction gratings.
Figure 2B:
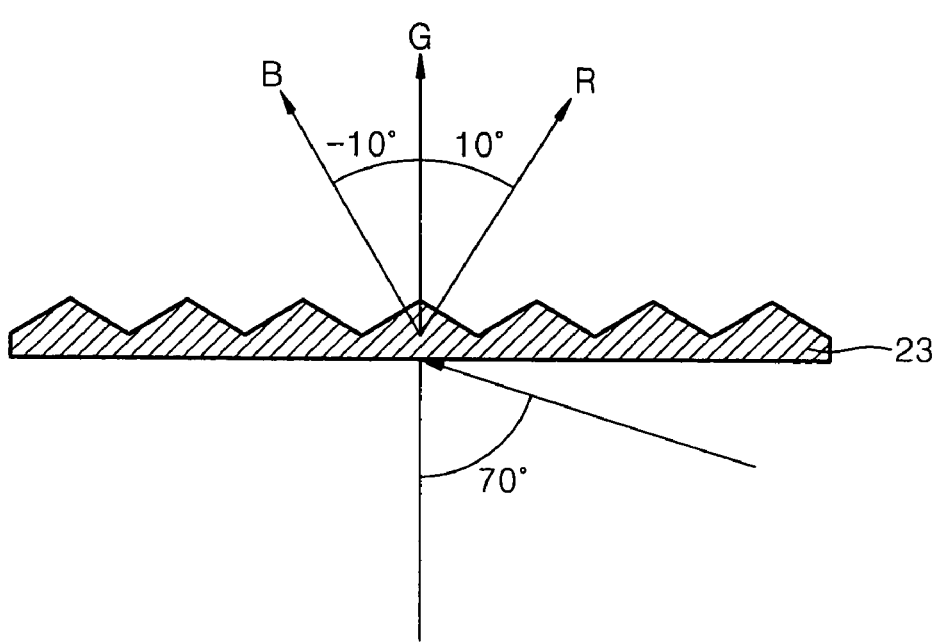
FIG. 2B is a cross-sectional view illustrating exit angles of green (G), red (R), and blue (B) light beams when light is incident on the diffraction gratings at an incident angle of 70°.
Figure 3:
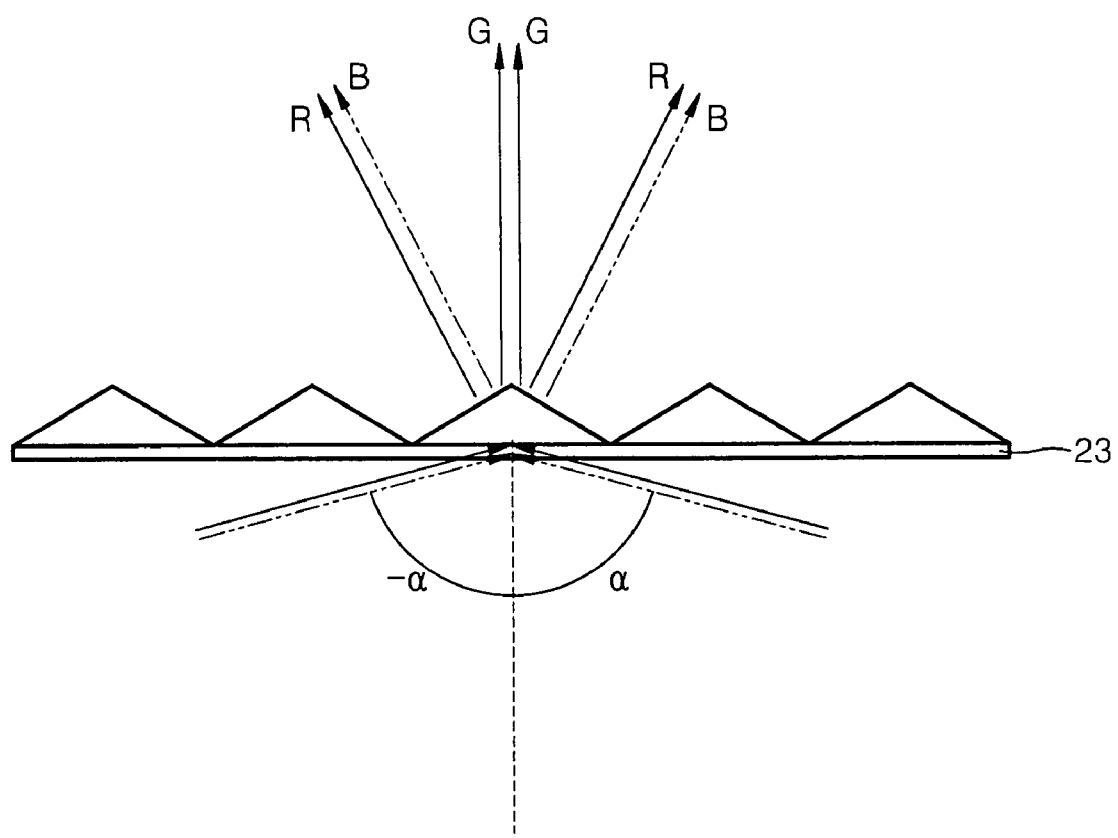
FIG. 3 is a cross-sectional view illustrating exit angles of green (G), red (R), and blue (B) light beams when white light entering from both sides is incident on the diffraction gratings.

The first and second light sources 22a and 22b are disposed on both the sides of the LGP 21 of the color-filterless LCD as shown in FIGS. 4 and 5. In this structure, when both the light sources 22a and 22b are turned on, as shown in FIG. 3, the green (G) light beam is not mixed with other colored light beams, but the blue (B) light beam and the red (R) light beam are disadvantageously mixed with other colored light beams incident in different directions. That is, white light incident on the color separation sheet 23 from the right side in FIG. 3 is divided into red (R), green (G), and blue (B) light beams when they are ordered from left to right. Meantime, white light incident on the color separation sheet 23 from the left side in FIG. 3 is divided into blue (B), green (G), and red (R) light beams when they are ordered from left to right. Accordingly, the red (R) and blue (B) light beams are mixed together, thereby failing to obtain good color separation.

To avoid the problem, the color-filterless LCD of the present non-limiting embodiment enables the first and second light sources 22a and 22b to be turned on alternately. The first and second light sources 22a and 22b may be turned on alternately at a speed of approximately 120 Hz two times faster than a frame rate in order to prevent flickering. Also, the amount of current supplied to each of the first and second light sources 22a and 22b may be increased about two times to obtain optimal brightness.

Referring to FIG. 4, when the first light source 22a is turned off and the second light source 22b is turned on, white light generated by the second light source 22b travels from right to left through the LGP 21 to be incident on the color separation sheet 23. Then, the white light is separated by the color separation sheet 23 into blue (B), green (G), and red (R) light beams when they are ordered from left to right. The exit angles of the blue (B), green (G), and red (R) light beams emitted from the color separation sheet 23 may be determined by the angle at which the white light is incident on the color separation sheet 23. For example, when the white light is incident on the color separation sheet 23 at an angle of approximately 70°, the green (G) light beam is emitted at an exit angle of 0°, the blue (B) light beam is emitted at an exit angle of approximately −10°, and the red (R) light beam is emitted at an exit angle of approximately +10°.

Next, the blue (B), green (G), and red (R) light beams emitted from the color separation sheet 23 are incident on the optical element sheet 11 that is formed on the bottom surface of the transparent substrate 12 and includes the plurality of cylindrical lenses. Each of the cylindrical lenses in the optical element sheet 11 corresponds to three pixels of the liquid crystal panel 13 as shown in FIG. 4. Since the light beams incident on the cylindrical lenses converge on different positions according to their incident positions and angles, the green (G) light beam converges on the central pixel among the three pixels, the blue (B) light beam converges on the left pixel, and the red (R) light beam converges on the right pixel as shown in FIG. 4. Since the different colored light beams are separately incident on the different pixels of the liquid crystal panel 13, color images can be produced without color filters. Finally, the light beams that are transmitted through the liquid crystal panel 13 are perpendicularly emitted by the DOE 14 and pass through the transparent substrate 15 to be seen by viewers.

On the other hand, referring to FIG. 5, when the first light source 22a is turned on and the second light source 22b is turned off, white light generated by the first light source 22a travels from left to right through the LGP 21 to be incident on the color separation sheet 23. Then, the white light is separated by the color separation sheet 23 into red (R), green (G), and blue (B) light beams when they are ordered from left to right. For example, when an incident angle is approximately 70°, the green (G) light beam is emitted from the color separation sheet 23 at an exit angle of 0°, the red (R) light beam is emitted from the color separation sheet 23 at an exit angle of approximately −10°, and the blue (B) light beam is emitted from the color separation sheet 23 at an exit angle of approximately +10°.

Next, the red (R), green (G), and blue (B) light beams emitted from the color separation sheet 23 are incident on the optical element sheet 11 that is formed on the bottom surface of the transparent substrate 12 and includes the plurality of cylindrical lenses. Next, in the same manner as described above, the respective light beams are incident through the cylindrical lenses on three different pixels that are continuously arranged in the liquid crystal panel 13. Unlike FIG. 4, however, the green (G) light beam converges on the central pixel, the blue (B) light beam converges on the right pixel, and the red (R) light beam converges on the left pixel as shown in FIG. 5.

As it can be seen from FIGS. 4 and 5, the red (R) and blue (B) light beams are incident on the right and left pixels, respectively, when the first light source 22a is turned on, whereas the red (R) and blue (B) light beams are incident on the left and right pixels, respectively, when the second light source 22b is turned on. Accordingly, the pixel to which data on the blue (B) light beam, in an image provided to the liquid crystal panel 13, is input during the operation of the first light source 22a, is the same as the pixel to which data on the red (R) light beam is input during the operation of the second light source 22b. Similarly, the pixel to which data on the red (R) light beam is input during the operation of the first light source 22a is the same as the pixel to which data on the blue (B) light beam is input during the operation of the second light source 22b.

Figure 6:
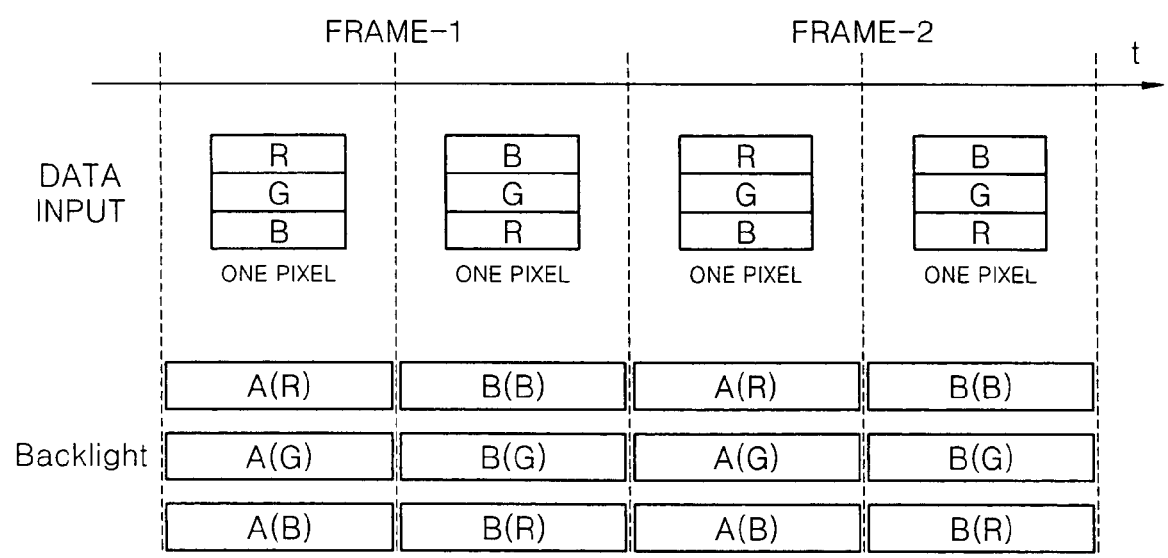
FIG. 6 illustrates a method of sequentially driving the color-filterless LCD of FIGS. 4 and 5 by synchronizing pixels of an LCD unit with an operation cycle of a backlight unit according to a non-limiting embodiment of the present invention.

Referring to FIG. 6, the liquid crystal panel 13 may be driven in synchronization with the operation cycle of the first and second light sources 22a and 22b so that color data can be input to the three different pixels, which are continuously arranged in the liquid crystal panel 13, in the order of red (R), green (G), and blue (B) light beams or in the order of blue (B), green (G), and red (R) light beams. As a result, clear color images can be displayed on the liquid crystal panel 13, whether either the first or the second light source 22a or 22b is turned on.

As described above, the color-filterless LCD according to the present non-limiting embodiment can improve brightness by disposing the first and second light sources 22a and 22b on both the sides of the LGP 21. In particular, since the first and second light sources 22a and 22b are alternately turned on at very high speed, brightness uniformity degradation is rarely noticed even though the LGP 21 is larger. Accordingly, while a conventional color-filterless LCD using an edge type backlight unit where a light source is disposed at one lateral side can use only 17-inch liquid crystal panels, the color-filterless LCD of the present non-limiting embodiment can use 19 to 32-inch liquid crystal panels. Accordingly, the color-filterless LCD of the present non-limiting embodiment can use large LCD units.

While the present invention has been particularly shown and described with reference to exemplary, non-limiting embodiments thereof, it will be understood by those of ordinary skill in the art that various changes in form and details may be made therein without departing from the spirit and scope of the present invention as defined by the following claims.

What is claimed is:

1. A color-filterless liquid crystal display comprising:
   a light guide plate uniformly emitting light, which is incident from both lateral sides of the light guide plate, through a top surface thereof;
   first and second light sources disposed on the both lateral sides of the light guide plate;
   a color separation sheet disposed on the top surface of the light guide plate and adapted to separate incident light into red, green, and blue light beams and emit the light beams at different exit angles;
   a liquid crystal panel having a liquid crystal layer divided into a plurality of pixels; and
   an optical element sheet disposed on a bottom surface of the liquid crystal panel and that includes a plurality of optical elements focusing the red, green, and blue light beams separated by the color separation sheet on three different pixels that are continuously arranged,
   wherein the first and second light sources are turned on alternately and repeatedly at a predetermined speed, and
   wherein the predetermined speed is approximately double a frame rate.

2. The color-filterless liquid crystal display of claim 1, wherein the liquid crystal panel is driven in synchronization with an operation cycle of the first and second light sources so that color data can be input to the continuously arranged three different pixels in an order of red, green, and blue light beams or in an order of blue, green, and red light beams.

3. The color-filterless liquid crystal display of claim 2, wherein each of the first and second light sources is turned on once while the liquid crystal panel displays an image of one frame.

4. The color-filterless liquid crystal display of claim 2, wherein the light guide plate has a flat shape.

5. The color-filterless liquid crystal display of claim 2, wherein the color separation sheet is a diffraction grating sheet in which a plurality of diffraction gratings are periodically arranged facing the liquid crystal panel.

6. The color-filterless liquid crystal display of claim 2, wherein, among the red, green, and blue light beams separated by the color separation sheet, the green light beam has an exit angle of 0°, and the red and blue light beams have exit angles that are substantially symmetric about the green light beam.

7. The color-filterless liquid crystal display of claim 6, wherein, when the first light source is turned on and the second light source is turned off, the blue light beam has a negative exit angle and the red light beam has a positive exit angle, and when the first light source is turned off and the second light source is turned on, the blue light beam has a positive exit angle and the red light beam has a negative exit angle.

8. The color-filterless liquid crystal display of claim 7, wherein, when the first light source is turned on and the second light source is turned off, the color data are input to the continuously arranged three different pixels in the order of blue, green, and red light beams, and when the first light source is turned off and the second light source is turned on, the color data are input to the continuously arranged three different pixels in the order of red, green, and blue light beams.

9. The color-filterless liquid crystal display of claim 2, wherein each of the first and second light sources includes a plurality of light emitting diodes respectively emitting the red, green, and blue light beams.

10. The color-filterless liquid crystal display of claim 2, wherein the plurality of optical elements are a plurality of cylindrical lenses that are arranged in parallel.

11. The color-filterless liquid crystal display of claim 10, wherein each of the plurality of cylindrical lenses corresponds to three pixels of the liquid crystal panel.

12. The color-filterless liquid crystal display of claim 2, further comprising a diffractive optical element that is disposed on a top surface of the liquid crystal panel and perpendicularly emits light passing through the liquid crystal panel.

13. The color-filterless liquid crystal display of claim 12, further comprising a glass substrate that is disposed on the diffractive optical element, the glass substrate having a flat top surface such that a front surface of the color-filterless liquid crystal display looks flat, the glass substrate protecting the diffractive optical element.

14. The color-filterless liquid crystal display of claim 2, wherein the liquid crystal panel has a size of 19 to 32 inches.

15. A color-filterless liquid crystal display of claim 1, wherein the first light source is disposed on a first lateral side of the light guide plate and the second light source is disposed on a second lateral side of the light guide plate.

16. The color-filterless liquid crystal display of claim 1, wherein the frame rate is approximately 60 Hz.

17. A color-filterless liquid crystal display comprising:
   a light guide plate;
   first and second light sources, the first light source disposed on a first lateral side of the light guide plate and the second light source disposed on a second lateral side of the light guide plate, the first and second light sources being turned on alternately and repeatedly at a predetermined speed;
   a color separation sheet disposed on the top surface of the light guide plate;
   a liquid crystal panel having a liquid crystal layer that is divided into a plurality of pixels; and
   an optical element sheet that is disposed on a bottom surface of the liquid crystal panel,
   wherein the predetermined speed is approximately double a frame rate.

18. The color-filterless liquid crystal display of claim 17, wherein the liquid crystal panel is driven in synchronization with an operation cycle of the first and second light sources so that color data can be input to three different pixels that are continuously arranged in the liquid crystal panel in an order of red, green, and blue light beams or in an order of blue, green, and red light beams.

19. A color-filterless liquid crystal display comprising:
   a light guide plate uniformly emitting light, which is incident from both lateral sides of the light guide plate, through a top surface thereof;
   first and second light sources disposed on the both lateral sides of the light guide plate;
   a color separation sheet disposed on the top surface of the light guide plate and adapted to separate incident light into red, green, and blue light beams and emit the light beams at different exit angles;
   a liquid crystal panel having a liquid crystal layer divided into a plurality of pixels; and an optical element sheet disposed on a bottom surface of the liquid crystal panel and that includes a plurality of optical elements focusing the red, green, and blue light beams separated by the color separation sheet on three different pixels that are continuously arranged, wherein the first and second light sources are turned on alternately, and wherein the liquid crystal panel is driven in synchronization with an operation cycle of the first and second light sources so that color data can be input to the continuously arranged three different pixels in an order of red, green, and blue light beams or in an order of blue, green, and red light beams.

* * * * *